United States Patent [19]

Brody et al.

[11] Patent Number: 4,718,579

[45] Date of Patent: Jan. 12, 1988

[54] BEVERAGE DISPENSING MACHINE

[75] Inventors: Deborah S. Brody, Brooklyn, N.Y.; Robert C. Kendall; Douglas E. Murray, both of Hamilton Square, N.J.; James R. Weldon, New York, N.Y.

[73] Assignee: General Foods Corporation, White Plains, N.Y.

[21] Appl. No.: 867,831

[22] Filed: May 27, 1986

[51] Int. Cl.⁴ .............................................. B67D 5/56
[52] U.S. Cl. .................................. 222/129.4; 222/564; 137/124; 137/132
[58] Field of Search ................ 366/341; 137/124, 132, 137/896; 222/108, 129-129.4, 133, 145, 236, 241-242, 412-413, 204, 416, 459, 564

[56] References Cited

U.S. PATENT DOCUMENTS

| | | | |
|---|---|---|---|
| 1,745,716 | 2/1930 | Rynders | 222/459 |
| 3,132,771 | 5/1964 | Truby | 222/416 X |
| 3,143,257 | 8/1964 | Mumford | 222/564 X |
| 3,157,320 | 11/1964 | Sherriffe | 222/459 X |
| 3,300,094 | 1/1967 | Rockola | 222/129.4 |
| 3,671,020 | 6/1972 | Krup | 259/10 |
| 3,865,136 | 2/1975 | Verschuur | 137/896 |
| 4,193,522 | 3/1980 | Edelbach | 222/145 |
| 4,194,651 | 3/1980 | Martin et al. | 222/108 |
| 4,414,996 | 11/1983 | Klepa | 137/132 X |
| 4,488,664 | 12/1984 | Cleland | 222/56 |

FOREIGN PATENT DOCUMENTS 838118  5/1952  Fed. Rep. of Germany ...... 137/124

Primary Examiner—Joseph J. Rolla
Assistant Examiner—Michael S. Huppert
Attorney, Agent, or Firm—Thomas R. Savoie; Barbara Toop D'Avanzo; Daniel J. Donovan

[57] ABSTRACT

A beverage dispensing machine which combines a powdered beverage mix and water in a first mixing chamber, provides for additional dispersion and solubilization of the powder in water in one or more additional mixing chambers and thereafter gravity feeds the powder-containing liquid into a low-capacity reservoir from which the beverage may be dispensed on an intermittent basis.

5 Claims, 5 Drawing Figures

BEVERAGE DISPENSING MACHINE

BACKGROUND OF THE INVENTION

Beverage dispensing machines are known in the art which are characterized by means for storing dry powdered ingredients, means for dispensing measured amounts of such ingredients into a mixing vessel, means to introduce measured quantities of water into said mixing vessel, and means for dispensing a beverage solution from the mixing vessel to the consumer. Typically the beverage will be dispensed into a cup and in the case of cold beverages the cup will preferably contain ice.

Prior art machines such as disclosed in U.S. Pat. Nos. 3,300,094 to Rockola, 3,671,020 to Krup and 4,194,651 to Martin et al. are relatively compact in that they do not contain any reservoir for storing the prepared beverage. The absence of such a reservoir not only saves space but also avoids the degradation the beverage may undergo during long hold periods. Such degradation could be caused by the loss of volatile aromas and flavors or by adverse interactions that could occur between the beverage ingredients in an aqueous medium.

The present invention relates to apparatus for mixing and dispensing beverages and more particularly to an improved apparatus for combining difficult to disperse and/or solubilize powdered drink mixes and water in predetermined quantities for effecting thorough dispersion and solubilization of the mix in the water and for subsequent dispensing of a homogeneous beverage.

The present invention is primarily designed for use with powdered beverage mixes which contain intensive sweeteners which only dissolve in cold water with difficulty. Aspartame is such a sweetener as this materials tends to clump and ball when combined with water. When such a powdered beverage mix is used, difficulties are encountered in effectively dispersing and solubilizing the ingredients in a relatively short cycle time. Failure to fully dissolve any of the functional ingredients contained in the powdered beverage mix will result in a reduced quality beverage having an unsightly appearance. In the case of intensive sweeteners, which are present in the mix at very low percentages, small amounts which fail to fully solubilize can greatly vary the taste characteristics of the beverage.

SUMMARY OF THE INVENTION

The present invention provides an improved mixing system for effecting full dispersion and solubilization of a powdered beverage mix in water. The mixing system is characterized by a plurality of sequential mixing chambers with each chamber possessing means to prevent the liquid from passing through the chambers in a unrestricted manner, said means effecting an increase in agitation or contact between the powder and the water. The mixing system also includes a low-capacity reservoir which will permit additional agitation and contact so as to insure solubilization of the powder without having the liquid be subjected to periods of extended holdups.

The low-capacity reservoir is sized and controlled so as to contain less than about four servings of the beverage. Flow through the reservoir is controlled such that the rate at which liquid flows into the reservoir slightly exceeds the rate at which the liquid flows out of the reservoir, even when the reservoir is at or near capacity. As will be recognized by those skilled in the art, for a given gravity flow system, the rate of flow out of the reservoir will vary depending on the height of liquid above the dispensing valve. Thus, as the reservoir empties flow out of the bottom of the reservoir will lessen.

The invention is characterized in terms of a beverage dispensing apparatus wherein the liquid and powder are combined in a first mixing chamber and then passed through one or more additional mixing chambers and on to a low-capacity reservoir. The second and subsequent mixing chamber may be flow-through chambers, siphon chambers or a combination thereof. Any flow-through chamber will, as shown in the drawings, be free of mechanical agitators and should include deflector means, such as baffles or deflector plates, which will provide further agitation of the liquid-powder mixture passing through the chamber. Any siphon chamber will provide agitation to the liquid-powder mixture as a result of being transferred from an upper chamber to a lower chamber through a siphon tube. As will be recognized by those skilled in the art, the maximum amount of liquid contained in any siphon chamber during any point in the dispensing cycle should only be a minor fraction of the capacity of liquid in the reservoir.

These and other features and advantages of the invention will more fully appear from the following description, made in connection with the accompanying drawings, wherein like reference characters refer to the same parts throughout the several views.

DESCRIPTION OF THE PREFERRED EMBODIMENT

Figure 1:
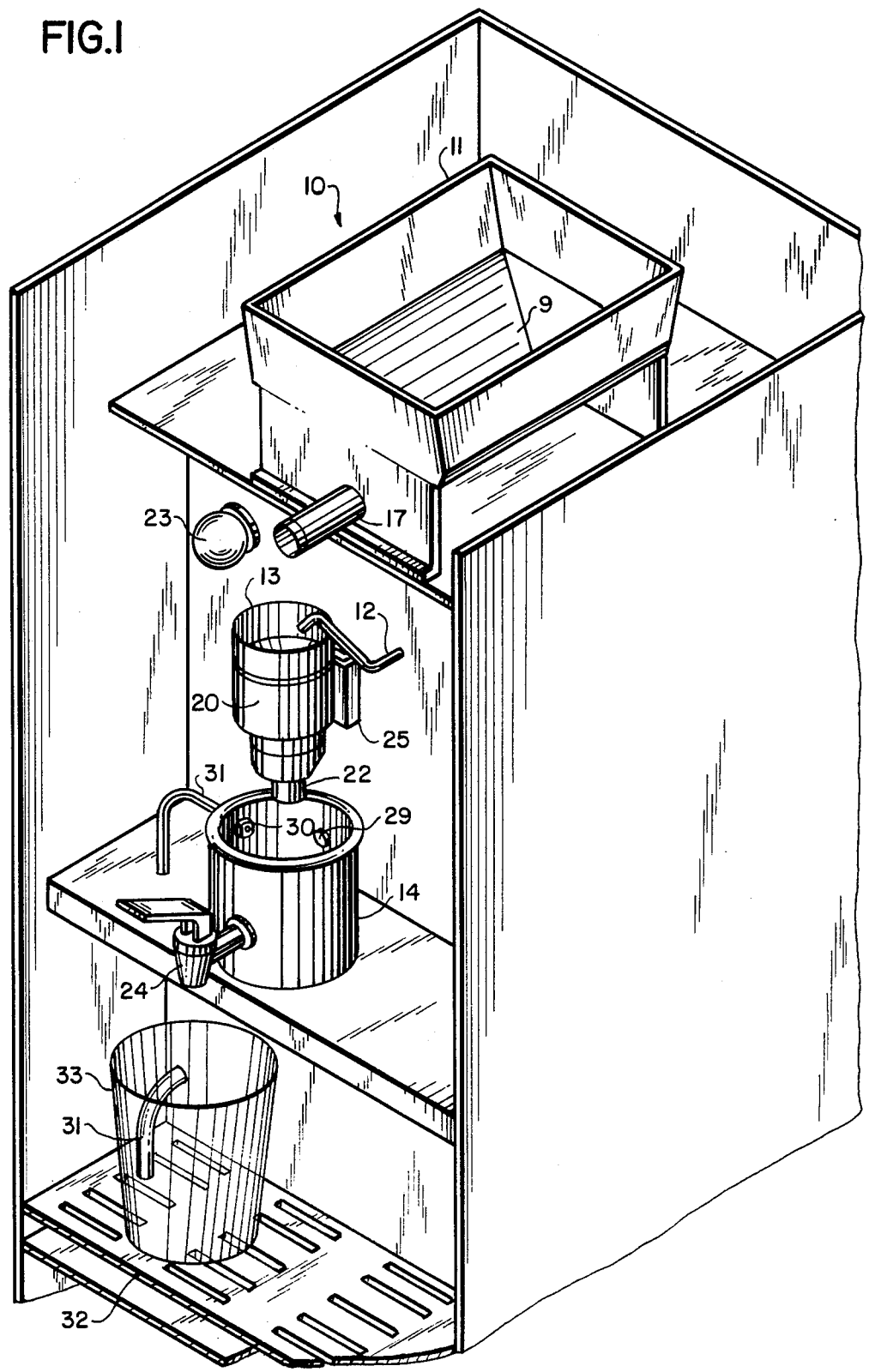
FIG. 1 is a perspective view of one embodiment of the beverage dispensing machine of this invention with the top and front cover panels of the dispenser unit cabinent being removed.

Referring to the drawings, there is shown a liquid vending or dispensing apparatus comprising generally a powder dispensing assembly 10 for dispensing a quantity of powdered mix, such as an aspartame-containing powdered soft drink mix, and a water supply tube which is connected to a water metering valve (not shown) for dispensing an amount of water for mixing with the powder. The quantities of powder and liquid are dispensed into a first flow-through mixing chamber 13 according to a predetermined ratio and in response to liquid level sensor 29 located in lowcapacity reservoir 14.

Powder dispensing assembly 10 includes a hopper 11 which may be of any practical shape but is shown as having a rectangular shape. The bottom portion of the hopper is curved so as to accommodate an auger. A removable cover (not shown) is positioned on the upper open end of the hopper 11. The bottom of the hopper is provided at one end with a discharge tube 17, the downstream or open end of which is positioned over the first mixing chamber 13.

Disposed just above the bottom of hopper 11 is a screw auger 18 which is journaled for rotation so as to convey powder along its longitudinal axis into discharge tube 17. Mounted for rotation with the screw auger is a pair of diverging arms 16 which serve to agitate and break up the powder contained in the hopper. A motor drive means (not shown) is typically used to rotate the auger. This drive means may be connected to the back end (i.e. opposite tube 17) of the auger which end can be made to extend through the back wall of the hopper. The auger 18 may be made from wire or the like and is formed so as to insure the feed of powder from the hopper 11 through discharge tube 17 and into the first mixing chamber 13.

Figure 2:
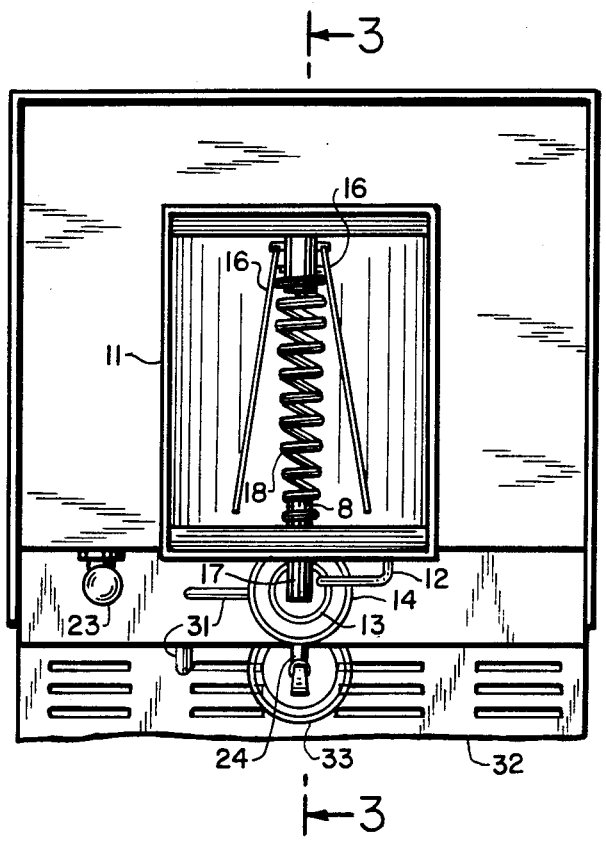
FIG. 2 is a top plan view of FIG. 1.
Figure 2A:
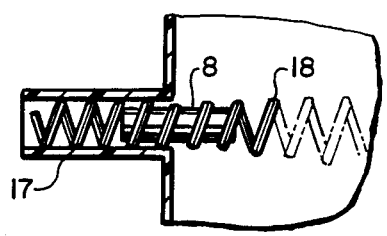
FIG. 2A is an enlarged view of the one portion of the powder feeding mechanism shown in FIGS. 2 and 3.

FIG. 2A shows an expanded view of the interaction between auger 18 and discharge tube 17. As shown a rod-shaped insert 8 is located within auger 18 at the point when auger 18 passes into discharge tube 17. This insert 8 provides a choking action which enables a more consistent and precise amount of powder to be dispensed.

The water metering valve and the auger motor are interconnected electrically or mechanically so as to feed water and powder, respectively, to the first mixing chamber during essentially the same time cycle. The size and speed of the auger and the flow rate of the water are designed and/or controlled such that the proper ratio of water to powder is fed to mixing chamber 13.

Mixing chamber 13 is, at its bottom end, in the shape of a funnel having sloped side wall 15 and a depending exit tube 19. Most of the powder discharged from tube 17 will fall to sloped side wall 15 and the stream of water exiting from outlet tube 12 is also directed towards sloped wall 15 in such a manner that water swirls around the side wall and mixes with the powder before flowing downwardly through exit tube 19 and into a second mixing chamber 20. Preferably the top of exit tube 19 is provided with a circular fitment or insert 28 which has a non-circular, geometric passageway formed therein. The shape of this passageway may be star-shaped with a six-pointed star having been found to give good results. The purpose of this shaped fitment is as a means to promote additional turbulence of the liquid stream passing through exit tube 19. Mixing chamber 20 is shown as being attached or mounted onto a cabinet support panel by means of bracket 25

Exit tube 19 directs the flow of liquid into a second mixing chamber 20 where the liquid is intercepted with deflector plate 21 which plate is mounted for support onto the side wall of chamber 20 such as by means of screw or rivet 26. Preferably the deflector plate is formed generally in the shape of a V, with the open end facing up, and the stream of liquid from exit tube 19 is directed towards the apex of the V. The deflector plate promotes further mixing of the liquid and any undissolved powder.

The liquid stream passes from deflector plate 21 to the lower portion of mixing chamber 20 where the stream falls upon a downwardly sloping surface 27 which directs the flow to depending exit tube 22. Tube 22 is offset from the center line of chamber 20 and also offset from the center line of exit tube 19 in order to provide a more complex pathway for the liquid.

Figure 3:
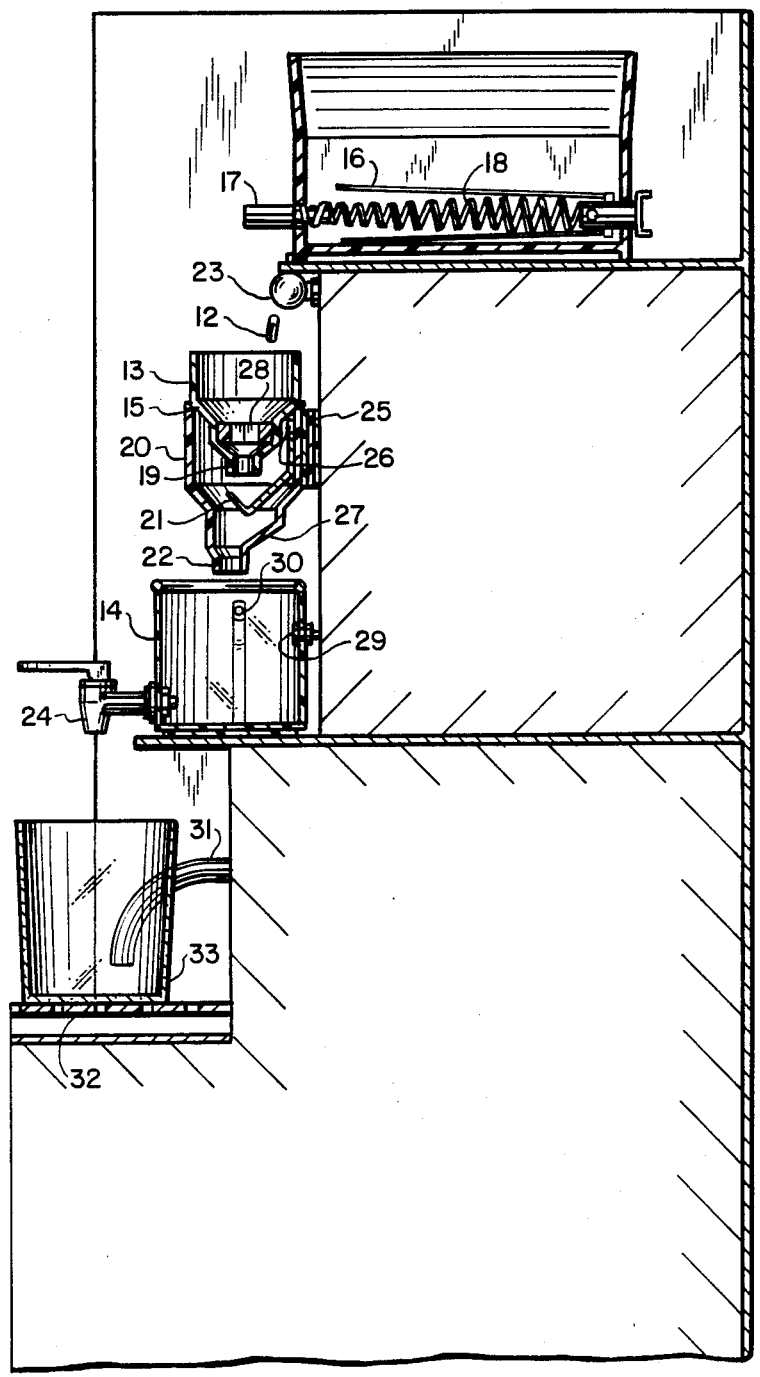
FIG. 3 is a cross-sectional side view taken generally along the indicated center line of FIG. 2.

In order to contain liquid and to reduce humidity within the mixing area of the apparatus it is desirable for the two mixing chambers 13 and 20 to be nested together. As shown in FIGS. 1 and 3 the funnel portion of chamber 13 may be fully positioned within and supported by chamber 20. There will be a desire to eliminate high humidity from the area of the dry powder, as caking of the powder in discharge tube 17 can result in uneven flow of powder and clumping of the powder. A heating element such as a light bulb 23 or resistance heater may be present near the end of discharge tube 17 area to further reduce humidity.

The liquid will pass from exit tube 22 into reservoir 14 where it is held for a short period prior to being dispensed. The flow of liquid from exit tube 22 may be intercepted by a second deflector plate (not shown) which could be carried and supported by the side wall of reservoir 14. The residence time within the reservoir and the additional mixing caused by the liquid passing out of exit tube 22 and into the body of liquid contained within the reservoir provide additional forces to cause complete dissolution of the powder.

The fluid will be retained in the reservoir until the dispensing valve 24 is opened. As shown in FIG. 1, the valve is a manually operated on and off valve mounted on and projecting forwardly from the lower end of the reservoir 14. Alternatively the valve could be electronically-controlled such that upon pushing of a button the valve remains open for a period of time to dispense a predetermined volume of liquid. Both of these valves are well known in the art.

As shown most clearly in FIG. 3, reservoir 14 is provided with a liquid level sensor 29 in order to maintain a relatively constant level of fluid within the reservoir. A suitable sensor would be a resistive probe with spaced-apart electrodes wherein the liquid in the reservoir is the conductor which serves to complete a circuit for stopping the flow of water and powder into mixing chamber 13. The volume of fluid retained in reservoir 14 will typically be less than about four cups of the beverage. In this manner, residence time of beverage in the reservoir is kept low and if the dispensing unit needs to be shut down for maintenance or cleaning, the contents of the reservoir may be discarded without a significant economic loss.

For dispensing units which contain only flow-through or gravity flow-type mixing chambers, the capacity of reservoir 14 may be reduced to about two and one-half cups or less. Reservoir capacity of up to about four cups should be employed when one or more siphon chambers are employed due to the time lag encountered in initiating flow out of a siphon chamber.

Preferably the reservoir will have an overflow port 30 and outlet tube 31 positioned in the reservoir wall at a level above the high liquid level sensor. The overflow tube 31 will lead to drip tray 32 where any flow from the tube will be visible to the operator. Drip tray 32 will provide a surface on which a cup 33 may be set for receiving dispensed beverage.

Figure 4:
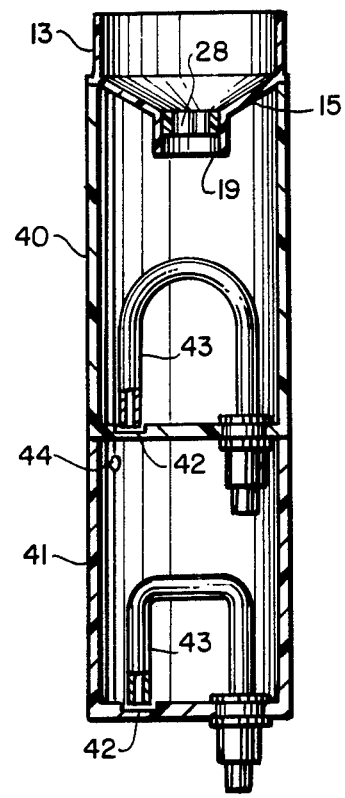
FIG. 4 is a view of an alternative embodiment of mixing chambers for use in this invention.
Figure 4:
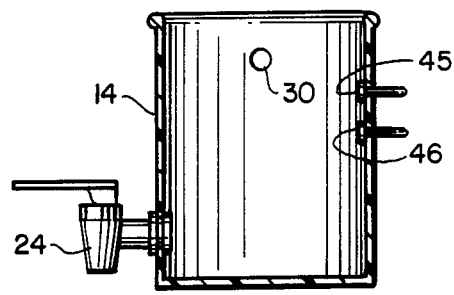

FIG. 4 depicts a mixing sequence wherein first and second siphon chambers, 40 and 41 respectively, are employed in lieu of mixing chamber 20 shown in FIG. 1. In this FIG. 4 common reference numerals refer to like elements found in FIGS. 1 and 3. Each siphon chamber includes a depression or well 42 at the bottom of the chamber which communicates with the in flow end of siphon tubes 43. Alternatively the bottom of the siphon chamber may be tapered for the purpose of collecting the last portion of liquid contained in the chamber. The out flow end of siphon tubes 43 pass through the bottom of the siphon chambers 40 and 41 at a point which is spaced from well 42. In the case of two or more sequential siphon chambers the chambers may be nested or stacked together as shown in FIG. 4 in which event it would be desirable to provide a vent opening 44 in the side wall of the second (and any subsequent) siphon chamber so that a vacuum is not created within the siphon chamber as the liquid flows out of the chamber.

In operation, siphon chamber 40 receives liquid from exit tube 19 of mixing chamber 13. The liquid accumulates in chamber 40 until the liquid level reaches the top of the siphon at which point liquid begins to flow through the siphon tube 43 and into siphon chamber 41 where a second siphon cycle is commenced. Preferably the flow from the upper siphon tube is directed so as to not impinge upon the lower siphon tube. Once flow in the siphon tubes 43 is begun the siphon chamber will be emptied of its liquid content.

From siphon chamber 41 liquid flows into reservoir 14. The level of liquid in the reservoir is controlled by means of high and low level sensors 45 and 46 which respectively stop and commence the flow of water and powder into mixing chamber 13.

The entire apparatus described herein, with the exception of dispensing valve 24 and drip tray 32 may be enclosed in a suitable cabinet in order to present a clean and neat outward appearance.

Having thus described the invention, what is claimed is:

1. A beverage dispensing machine comprising a hopper holding a supply of a powdered beverage mix which contains an intensive sweetener, a powder dispensing means connected with said hopper, said dispensing means including a discharge tube through which powder is intermittently supplied to a first funnel-shaped mixing chamber, water supply and delivery means for delivering water to the mixing chamber each time powder is received therein in order to begin dispersion and solubilization of the powder in the water within the first mixing chamber, and exit tube from said first mixing chamber leading to a second chamber, means within the second chamber to prevent the liquid from passing through said second chamber in an unrestricted manner said means being effective to promote further dispersion and solubilization of the powder in the water and said second chamber being free of any mechanical agitator, means to thereafter feed the powder and water mixture into a reservoir in a manner which provides additional dispersion and solubilization to any undissolved powder, said reservoir having a capacity of no greater than about four cups of beverage and said reservoir having a dispensing valve for dispensing beverage on demand, with the flow of beverage into said reservoir slightly exceeding the flow of beverage out of said reservoir.

2. The beverage dispensing machine of claim 1 wherein the second chamber is a mixing chamber which includes a deflector plate which is positioned to intercept the flow of liquid from said first mixing chamber.

3. The beverage dispensing machine of claim 2 wherein the deflector plate is generally V-shaped.

4. The beverage dispenser of claim 1 wherein the capacity of the reservoir is less than about two and one-half cups.

5. The beverage dispensing machine of claim 1 wherein the intensive sweetener is aspartame.

* * * * *